Patented Feb. 10, 1942

2,272,616

UNITED STATES PATENT OFFICE 2,272,616

PHOSPHATIDIC COMPOUND

Benjamin H. Thurman, Bronxville, N. Y., assignor to Refining, Inc., Reno, Nev., a corporation of Nevada No Drawing. Application August 14, 1939, Serial No. 290,083

11 Claims. (Cl. 260—403)

This invention relates to new phosphatidic compounds and method of producing the same, and more particularly to compounds and methods in which alkali metal salts are reacted with phosphatides to produce phosphatide compounds containing alkali and the anion associated with the alkali in said alkali metal salts.

It has been found that alkali metal salts in general react with phosphatides to produce true chemical compounds which form clear solutions. The compounds contain not only the phosphorous and nitrogen of the original phosphatide but also contain the alkali metal and the anion of the alkali metal salt reacted with the phosphatide. For example, reacting sodium phosphate with the phosphatide produces an increased phosphorous content in the resulting compound, while the nitrogen content is retained, and the resulting compound also contains sodium. The new compounds are preferably formed by mixing the dry alkali metal salt with phosphatides in the presence of sufficient water to form a paste. The reaction may be accelerated by heating the resulting paste to temperatures as high as 212° F. although the reaction will take place at ordinary room temperatures if the reacting mass is stirred for a sufficient length of time. The compounds of the present invention may be separated from the reaction mass by dehydrating the paste above referred to, preferably in a vacuum, at temperatures preferably below 212° F. Dehydration can also be effected by treating with acetone as the resulting compound is insoluble in acetone. The dehydrated mass may then be extracted with a solvent for the desired compound. The compound formed between sodium phosphate and the phosphatides is completely soluble in petroleum ether, which material can be employed to extract the sodium phosphate salt of the phosphatide from the dehydrated mass.

It is, therefore, an object of the invention to provide new phosphatidic compounds resulting from the reaction between phosphatides and alkali metal salts.

Another object of the invention is to provide a process of producing new phosphatidic compounds in which an alkali metal salt is reacted with a phosphatide.

Another object of the invention is to provide as a product of manufacture a phosphatide compound containing sodium and increased amounts of phosphorus.

Another object of the invention is to provide a process of producing a phosphatide compound containing sodium and increased amounts of phosphorus.

Another object of the invention is to provide a phosphatidic compound containing sodium and soluble in ether and a process of producing the same.

A further object of the invention is to provide a phosphatide having reduced acidity.

A still further object is to provide a sodium phosphate salt of a phosphatide.

The invention will be described in detail with respect to the production of a phosphatidic compound containing sodium and increased amounts of phosphorus.

As an example of such a compound, 163 grams of purified corn oil phosphatides were mixed with 80 grams of $Na_3PO_4$ in the presence of 160 grams of water. This mixture formed a paste which was stirred at a temperature of 120° F. for approximately 2 hours. The paste was then dehydrated in a vacuum chamber with continued stirring. A temperature of approximately 120° F. was maintained in the vacuum chamber and a vacuum of approximately 29 inches of water maintained. Substantially all of the free water was removed from the paste. This paste was then extracted with petroleum ether and the ether extract subjected to vacuum treatment to remove the ether. The resultant product was a clear, amber, viscous, oily material which was odorless and had a slightly salt taste.

The original purified corn oil phosphatide had a nitrogen content of 1.2% and a phosphorus content of 2.1%. The resulting compound obtained as above had a phosphorus content of 4.12%, a nitrogen content of .98% and a sodium content of .75%, indicating that substantial amounts of phosphate had combined with the phosphatide to form a compound which also contains some combined sodium phosphate.

This product was very readily and rapidly dispersable in water. The original phosphatides are not soluble in water, but appear to hydrate slowly to form compounds which disperse in water with difficulty. No evidence of hydration was noted with the present compound, as there was no time lag before it completely dispersed in the water. The compound is, furthermore, easily dispersable in fatty oils even in the cold. It completely dissolves in such oils above temperatures of approximately 150° F. It may be made completely oil soluble even at room temperatures by incorporating about 10% of fatty oils in the petroleum ether extract before the ether is completely evaporated therefrom. This compound is an extremely good emulsifying agent and has excellent antioxidant properties. It is also less acidic than the original phosphatide. The corn oil phosphatides employed had a pH of about 4.5, whereas the new compound had a pH of about 6.8. No free alkali could be detected in the resulting compound. Since the pH of the compound approached the neutral point, it can be added to refined products such as refined vegetable oils without imparting acidity thereto. For example, it can be employed in the production of mayonnaise or margarine to retain water emulsified with the oil or fats without increasing the acidity of the resulting product. This enables stiffer mayonnaise to be produced and also increases the water retention properties of margarine.

By increasing the time of reaction of the sodium phosphate with the phosphatide to, for example, 4 to 16 hours, depending upon the temperature of reaction, increased amounts of sodium phosphate can be made to combine with the phosphatide to produce compounds containing as high as 10% sodium. At approximately 7% sodium content a sodium phosphate salt of the phosphatide is obtained. This compound dissolves in ether to give a clear solution and has a pH above 8. These compounds may be employed wherever an emulsifying agent is required and, as stated before, may also be employed as antioxidants or reversion preventing agents. In the production of the compounds of the present invention it is preferred to employ phosphatides which are free of linolenic acid radicals such as corn or cottonseed phosphatides because of the stability of these phosphatides. The more stable phosphatides produce extremely stable compounds with alkali metal salts which are capable of withstanding relatively high temperatures, for example, temperatures around 450° F., without destruction or decomposition. Other phosphatides containing more highly unsaturated fatty acid radicals such as soya bean phosphatides, fish or animal phosphatides, may, however, be employed, although the resulting compounds are not as stable and care must be employed to not subject the phosphatides to much elevation in temperature during the reaction between the phosphatides and the alkali metal salt.

Other alkali metal salts such as sodium borate, sodium nitrate, sodium sulfate, sodium gluconate, sodium lactate, sodium tartrate and sodium pyrophosphate, as well as the equivalent potassium salts, may also be employed to produce compounds varying in their properties and usable for various purposes. In general, it has been found that the salts of the alkali metals will react with phosphatides to form the complex compounds containing both the alkali metal and the anion of the salt. The amount of sodium in the resultant compound will vary with the alkali metal salt employed and the degree of reaction obtained between the salt and the phosphatide. For example, the sodium content may vary between 0.1 and 10%, although the preferred range of sodium content will usually fall between 0.5 and 4%.

At the present time, the compounds resulting from reacting with the phosphatides appear to have the greatest utility. The increase of phosphorus content in the resulting compound over that of the original phosphatides is a desirable property for edible purposes. Furthermore, the complete oil and water dispersability of the resulting compounds imparts valuable properties thereto, particularly when employed as an emulsifying agent. These compounds are particularly valuable in producing high ratio shortening for bakery products, that is to say, a small amount thereof, for example 0.25 to 5% on the basis of the shortening, will enable ratios of sugar to flour in excess of 1 to 1 to be employed. They are also very useful as a constituent in detergents, since they have excellent emulsifying properties and are compatible with all common detergent materials. It has also been found that they possess extremely good water softening properties. For example, they may be employed with alkali metal soaps to produce hard water soaps. When employed with such soaps they prevent the precipitation or deposition of insoluble alkali earth metal soaps such as those of calcium or magnesium.

Certain of the other compounds mentioned, for example, that formed with sodium borate, are not edible. Also, certain of the resulting compounds other than that resulting from reacting sodium phosphate with phosphatides have properties which vary widely from the phosphate compound. For example, the compound resulting from reacting sodium borate with phosphatides acts as a deemulsifying rather than an emulsifying agent.

While I have described the preferred embodiments of my invention, it is understood that the details thereof may be varied within the scope of the following claims.

I claim:

1. As a product of manufacture, a new phosphatidic compound resulting from the reaction between an alkali metal salt of an inorganic acid and a phosphatide.

2. As a product of manufacture, a new phosphatidic compound resulting from the reaction between an alkali metal salt of an inorganic acid and a vegetable phosphatide.

3. As a new product of manufacture, a new phosphatidic compound resulting from the reaction between an alkali metal phosphate and a vegetable phosphatide.

4. As a new product of manufacture, a new phosphatidic compound resulting from the reaction of sodium phosphate with a phosphatide.

5. As a new product of manufacture, a new phosphatidic compound resulting from the reaction of sodium borate with a phosphatide.

6. As a new product of manufacture, a new phosphatidic compound resulting from the reaction of sodium sulfate with a phosphatide.

7. As a new product of manufacture, a phosphatide compound resulting from the reaction of alkali metal phosphate with a vegetable phosphatide which is free of linolenic acid.

8. As a new product of manufacture, a sodium phosphate salt of a vegetable phosphatide free of linolenic acid.

9. The process of producing phosphatidic compounds containing alkali metals which comprises reacting a phosphatide with an alkali metal salt in the presence of water, dehydrating the reaction products, and extracting said compounds from said products with a solvent therefor.

10. The process of producing phosphatidic compounds containing alkali metal, which comprises, reacting a phosphatide with sodium phosphate in the presence of water, dehydrating the resulting reaction products and extracting said compound from said dehydrated reaction products with petroleum ether.

11. The process of producing phosphatidic compounds containing alkali metals, which comprises, reacting a phosphatide with sodium phosphate in the presence of water, dehydrating the resulting reaction products, extracting said compound from said dehydrated reaction products with petroleum ether, and evaporating said petroleum ether from said compound.

BENJAMIN H. THURMAN.